March 16, 1943.    L. E. OLSEN    2,313,763
NUT ASSEMBLY
Filed Dec. 24, 1941
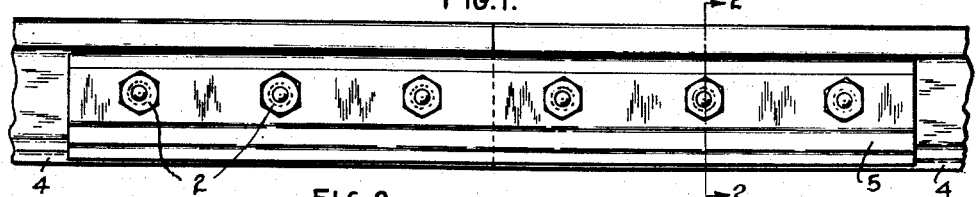
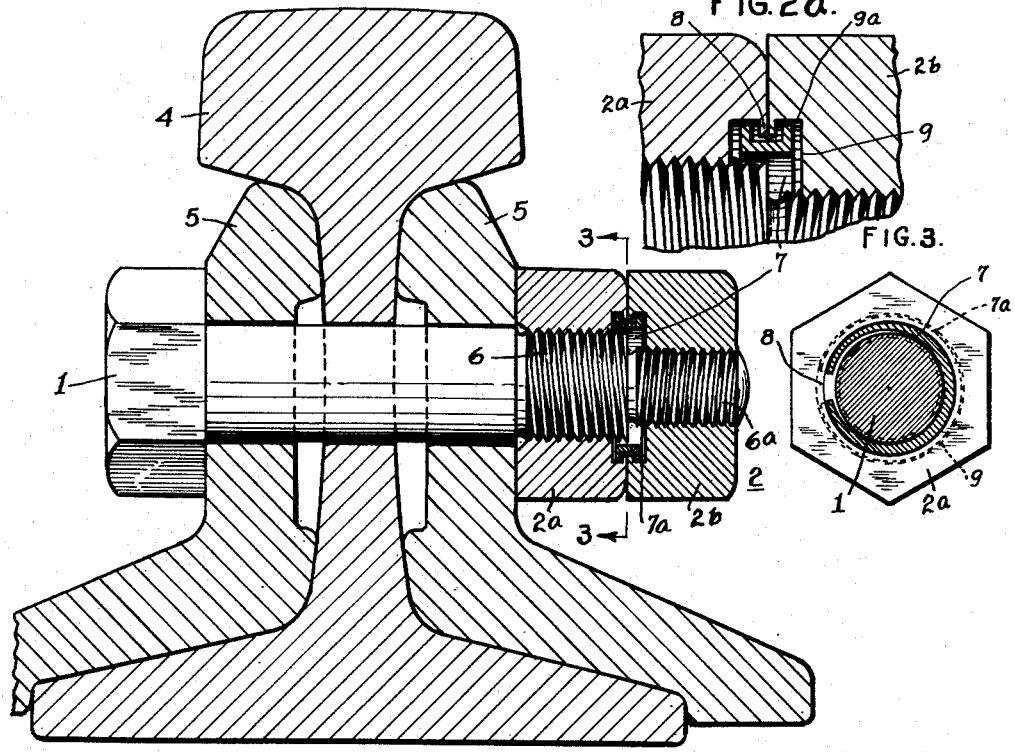
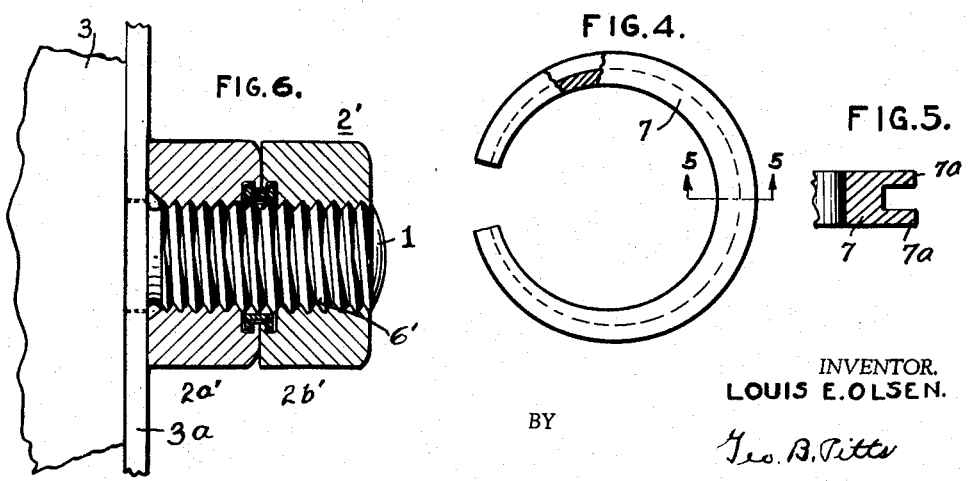
INVENTOR.
LOUIS E. OLSEN.
BY
Geo. B. Pitts Patented Mar. 16, 1943

2,313,763

UNITED STATES PATENT OFFICE 2,313,763

NUT ASSEMBLY

Louis E. Olsen, Cleveland, Ohio

Application December 24, 1941, Serial No. 424,225

2 Claims. (Cl. 151—15)

This invention relates to a nut assembly for attachment to or engagement with a threaded element, more particularly an assembly of nuts wherein provision is made for locking either or both nuts against accidental removal. While the invention may be adapted to threaded elements of various sizes, it is particularly advantageous for clamping together parts of a ponderous character, especially where such parts are subjected to stresses and vibrations.

One object of the invention is to provide an improved assembly of connected-together nuts wherein the connection therebetween serves to prevent loosening of the nuts.

Another object of the invention is to provide an improved nut assembly comprising a plurality of nuts rotatably connected together end to end, connections between the nuts being disposed inwardly of the engaging faces thereof to prevent access to the connections.

Another object of the invention is to provide an improved nut assembly comprising a right hand threaded nut, a left hand threaded nut axially related thereto and connections between them arranged to permit both nuts to be simultaneously threaded on a screw threaded element and tightened one against the other.

Another object of the invention is to provide an improved nut assembly for engaging a screw threaded element, comprising a pair of axially related nuts and a device between and interconnected to the nuts arranged to bend them against relative rotative movement when the outer nut is backed up on the screw threaded element relative to the inner nut.

Another object of the invention is to provide an improved lock nut assembly which is relatively simple and readily assembled.

Other objects of the invention will be apparent to those skilled in the art to which my invention relates from the following description taken in connection with the accompanying drawing, wherein Fig. 1 is a side view of the end portions of two track rails joined by fish-plates, which parts are bolted together by a nut assembly embodying my invention.

Fig. 2 is a section on the line 2—2 of Fig. 1.

Fig. 2a is a fragmentary section on the line 2—2 of Fig. 1, enlarged.

Fig. 3 is a section on the line 3—3 of Fig. 2.

Fig. 4 is a plan view of the connecting member between the nuts, parts being broken away.

Fig. 5 is a section on the line 5—5 of Fig. 4.

Fig. 6 is a fragmentary view, partly in section, illustrating a modified embodiment of the invention.

In the drawing, 1 indicates a clamping element having a screw threaded portion arranged to be engaged by a nut assembly indicated as an entirety at 2. The clamping element 1 may consist of a bolt as shown in Figs. 1 and 2 or a stud integrally connected to and extending from a wall 3, as shown in Fig. 6. For descriptive purposes and as illustrating one application of the invention, I have shown in the drawing the end portions of two related track rails 4 and fish-plates 5 engaging the opposite sides thereof, bolted together in rigid relation by bolts 1 each provided on its outer end portion with screw threads engaged by the nuts 2a, 2b, of the nut assembly 2. In the preferred form of construction, as particularly shown in Figs. 2 and 2a, the threaded portion of the bolt 1 consists of inner and outer sections, one having a right-hand thread and the other section having a left-hand thread, the nuts being correspondingly internally threaded. Where the clamping element 1 is provided with both right and left hand threads, the outer section is reduced in diameter, to permit attachment of that nut which is threaded on the inner threaded section of the element 1. In the arrangement shown, the inner threaded section is provided with right-hand screw threads 6 and the outer threaded section is provided with left-hand screw threads 6a.

The nut assembly 2 consists of two nuts 2a, 2b, connected together, as later set forth, each threaded to fit and be threaded on one of the threaded sections 6, 6a, of the bolt 1. As shown, the nut 2a fits the threaded section 6 and the nut 2b fits the threaded section 6a. The connection between the nuts 2a, 2b, comprises a split ring 7 the outer wall of which from end to end is formed with a continuous groove to provide spaced rims 7a, which overlap annular ledges 8 provided on the adjacent ends of the nuts 2a, 2b. The diameter of the inner wall of the ring 7 is somewhat greater than the external diameter of the threaded section 6 to clear the threads thereon when the nut 2a is engaged with and tightened on this section. As shown, the inner end of each nut is formed with an annular recess 9 concentric to the axis of the nut and under cut, as shown at 9a to form the ledge 8. The ring 7 fits into the recesses 9 with the rims 7a thereof projecting into the undercut portions 9a behind the ledges 8, so as to engage therewith and co-operate to connect the nuts together. The recesses 9 are large enough in diameter to freely accommodate the ring between the ledges 8 and the threaded section 6 and provide a loose fit between the side walls of the undercut portions 9a of the recesses 9 and the rims 7a and the bottom wall of each recess 9 is also spaced from the inner wall of the adjacent ledge 8 slightly greater than the thickness of the adjacent rim 7a to permit limited relative axial movement between the ring and the adjacent nut, the result being that the ring may float in the recesses 9, and thus permit free relative rotative movements between the nuts 2a, 2b, so that they may be readily assembled on the clamping element 1 and limited axial movement of the nut 2b relative to the nut 2a effected. It will thus be seen that after the nut 2a is tightened in final position, the nut 2b may be tightened thereagainst to effect a locking relation with the nut 2a and thus prevent loosening of the latter. It will be observed that the ring 7 serves to loosely connect the nuts 2a, 2b, together when disengaged from the clamping element 1, so that neither one can be misplaced; that is, when clamping operations are to be carried out, the two nuts are together ready to be threaded on the clamping element 1. However, the ring 7 is adapted to effect a separate function to insure against detachment of the nut assembly. In this connection it will be noted that if the nut 2b, for any reason (accidental or otherwise) is backed up relative to the nut 2a, the inner walls of the ledges 8 will engage the inner walls of the rims 7a to effect a binding relation therebetween and thus prevent either nut from turning.

To position the ring in the recesses 9, the nuts are held in fixed end to end relation, then the ring 7 is contracted circumferentially and inserted through the opening in the nut 2a into alinement with the recesses and then allowed to expand thereinto. The ring 7 may be formed in any desired manner. It may be formed from a continuous ring having concentric or eccentric inner and outer walls and a section cut out to provide for its contraction. Preferably a cylinder is first provided with its inner wall eccentric to its outer wall and then the cylinder is cut transversely along predetermined spaced lines to provide the rings 7. The grooves for the rings may be formed in the outer wall of the cylinder before the cutting thereof takes place or in the rings.

While in the preferred arrangement the bolt 1 is provided with right and left hand threaded sections and the nuts are correspondingly threaded, the bolt 1 may be provided throughout its threaded portion with either a right or left hand thread and both nuts provided with similar screw threads. This latter arrangement will be evident from Fig. 6, wherein the clamping element 1 is shown as a stud projecting from the wall 3 and having a right-hand thread 6' throughout its threaded portion engaged by a nut assembly 2' to clamp a plate 3a against the wall 3. As will be evident, the screw threads of the nuts 2a', 2b', forming the nut assembly 2' are provided with screw threads corresponding to those provided on the stud 1.

It will be observed that the connection between the nuts permits them to rotate one relative to the other and also move axially relative to each other, so that they may be readily applied to a clamping element and the outer nut tightened against the inner nut to lock it. It will also be observed that if the outer nut is backed-up, the connection will serve to lock it against rotation. Accordingly, any attempt by a maliciously inclined person to remove the nuts would meet with difficulty as the farther the outer nut is backed-up the tighter the locking action would become; in this connection it is to be noted that when the outer nut is backed-up independently of the inner nut, the locking action is between the nuts and not between either nut and the clamping element 1, and both nuts are simultaneously locked against relative movement.

It is also to be observed that the recesses 9 are formed in the opposed faces around the threaded openings therethrough, so that the ring is inaccessible to prevent tampering therewith. Accordingly, when the nut assembly is positioned on a clamping element, the ring is sealed or enclosed between the nuts and cannot be removed or made ineffective.

Where the clamping element 1 is provided with right and left hand threaded sections, both are preferably provided with threads of the same pitch.

To provide for a substantially predetermined axial movement between the nuts, the spacing of the bottom wall of each recess 9 from the inner face of the adjacent ledge 8 will depend upon the pitch of the screw threads of the nuts and clamping element, as it is desirable to provide a minimum axial movement to effect a quick locking together of the nuts where and in the event the outer nut is backed up. Accordingly, where the thread is coarse, as compared to a fine screw thread, this spacing is reduced as a quarter or half turn of the nuts, one relative to the other, will be sufficient to facilitate the attachment of the nuts in position and effect a quick locking relation between them when the outer nut is backed up. Where the parts are provided with a fine thread, the spacing is increased as a greater relative rotative movement is required to insure sufficient axial movement to permit ready attachment of the nuts on the clamping element into final position.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. A nut assembly for engaging a screw threaded clamping element, comprising a pair of nuts in axial relation, the opposed faces of the nuts surrounding the openings therethrough being formed with concentric related recesses each undercut to provide an annular ledge, and a ring mounted in and loosely fitting said recesses and providing on its outer periphery with rims fitting into the undercut portions of said recesses, the spacing between walls of said undercut portions providing for limited axial movement between the nuts, whereby the outer nut may be tightened against the inner nut, but backing-off of the outer nut effects a binding relation between the ledges and rims to limit the latter movement.

2. The combination of a clamping element having inner and outer screw threaded portions adjacent to one end of said element, one portion being provided with right-hand screw threads and the other portion being provided with left-hand screw threads, the outer threaded portion being of smaller diameter than the inner threaded portion, a pair of inner and outer nuts respectively threaded to engage the threaded portions of said element and adapted to clamp parts together, the outer nut being arranged to lock the inner nut in position, the opposed faces of the nuts surrounding the openings therethrough being formed with concentric related recesses each undercut to provide an annular ledge, and a ring mounted in and loosely fitting said recesses and provided on its outer periphery with rims fitting into the undercut portions of said recesses, the spacing between the walls of said undercut portions providing for limited axial movement between the nuts, whereby the outer nut may be tightened against the inner nut, but backing-off of the outer nut effects a binding relation between the ledges and rims to limit the latter movement.

LOUIS E. OLSEN.